United States Patent
Dawson et al.

(10) Patent No.: US 6,389,543 B1
(45) Date of Patent: May 14, 2002

(54) SYSTEM AND METHOD FOR COMMAND ROUTING AND EXECUTION IN A MULTIPROCESSING SYSTEM

(75) Inventors: Colin Scott Dawson; Michael Allen Kaczmarski; Donald Paul Warren, Jr., all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/143,820

(22) Filed: Aug. 31, 1998

(51) Int. Cl.⁷ ............................. G06F 9/00; H04L 9/36

(52) U.S. Cl. .................. 713/202; 709/102; 709/200

(58) Field of Search .................. 713/200, 201, 713/202; 709/102, 106, 200, 201, 202, 203, 244, 217, 218, 219, 227

(56) References Cited

U.S. PATENT DOCUMENTS

| | | | |
|---|---|---|---|
| 5,222,017 A | | 6/1993 | Yellowley et al. ............ 364/132 |
| 5,442,791 A | | 8/1995 | Wrabetz et al. ............. 395/650 |
| 5,644,719 A | | 7/1997 | Aridas et al. ........... 395/200.12 |
| 5,761,669 A | | 6/1998 | Montague et al. ........... 707/103 |
| 5,774,660 A | | 6/1998 | Brendel et al. ......... 395/200.31 |
| 5,787,427 A | * | 7/1998 | Benantar et al. ............ 713/201 |
| 5,898,835 A | * | 4/1999 | Truong ..................... 709/217 |
| 5,908,469 A | * | 6/1999 | Botz et al. ................. 713/201 |
| 5,953,514 A | * | 9/1999 | Gochee ..................... 395/500 |
| 6,029,246 A | * | 2/2000 | Bahr ........................ 713/200 |
| 6,085,227 A | * | 4/2000 | Edlund et al. .............. 709/203 |
| 6,081,804 A | * | 6/2000 | Smith ......................... 707/5 |
| 6,125,457 A | * | 8/2000 | Crisan et al. ............... 713/201 |

FOREIGN PATENT DOCUMENTS

JP          10-69462 A * 3/1998 ............ G06F/15/00

OTHER PUBLICATIONS

"APS Text Search & Retrieval Training Documentation Master", U.S. Patent & Trademark Office, vol. 3, p. 1–5, Sep. 1997.*
"Automated Patent System (APS) Workstation Reference Manual", U.S. Patent & Trademark Office, pp. 6–3, 9–1 through 9–4, 9–7,9–15, and 9–16, Jul. 1996.*
Excerpts from *AIX Version 4.2.1 Online Operating Manual*, (describing "rsh" and "rexee" commands, copyright 1992, 1996.
Tiovoli TME 10 Framework Reference Manual, version 3.1, pp. 1–319 thru 1–322, (Sep. 1996).

* cited by examiner

*Primary Examiner*—Gail Hayes
*Assistant Examiner*—Christopher A. Revak
(74) *Attorney, Agent, or Firm*—Dan Hubert & Assoc.

(57) ABSTRACT

Any node in a multi-node processing system may be employed to route commands to a selected group of one or more nodes, and initiate local command execution if permitted by local security provisions. The system includes multiple application nodes interconnected by a network, and one or more administrator nodes each coupled to at least one application node. Each administrator node has assigned security credentials. The process starts when the administrator node transmits input to one of the application nodes (an "entry" node). The input includes a command and routing information specifying a list of desired application nodes ("destination" nodes) to execute the command. In response to this input, the entry node transmits messages to all destination nodes to (1) log-in to the destination nodes as the originating administrator node, and (2) request the destination nodes to execute the command. Consulting locally stored security information, each destination node determines whether the entry node's log-in should succeed. If so, the destination node consults locally stored authority information to determine whether the initiating administrator node has authority to execute the requested command. If so, the destination node executes the command. The destination node sends the entry node a response representing the outcome of command execution. The entry node organizes such responses and provides a representative output.

46 Claims, 4 Drawing Sheets

SYSTEM AND METHOD FOR COMMAND ROUTING AND EXECUTION IN A MULTIPROCESSING SYSTEM

BACKGROUND OF THE INVENTION

1. Field of the Invention

The present invention relates to multi-node computing systems. More particularly, the invention concerns a multi-node computing system where any node in the system may be employed to route commands to a selected group of nodes and initiate local command execution if permitted by local security provisions.

2. Description of the Related Art

In different forms, multiprocessing systems are in widespread use today. As one example, multiprocessing systems include "supercomputers" and other similar machines that utilize many separate high speed processors. This arrangement is popular because collectively, the processors provide a tremendously powerful computing engine. Multiprocessing systems also include "distributed processing systems," which use typically multiple physically distinct computing machines to cooperatively perform a task. Advantageously, with this arrangement a computing task that is too intensive for any one machine can be spread out and processed in smaller parts by many different machines. In addition to these examples, multiprocessing systems can include a hybrid of the two, or a variety of other arrangements with multiple computers, microprocessors, application program instances, program threads, or other processing elements.

In one popular example of distributed processing system, many servers are networked to provide a data storage system that provides users with many sophisticated data management capabilities. This arrangement may be called a distributed storage system; examples of this approach may be found in various known networks implementing the Adstar Distributed Storage Manager (ADSM) software of International Business Machines Corp. (IBM). Although this and other similar systems constitute a significant advance and even enjoy widespread commercial success today, IBM continually seeks to improve the performance and efficiency of their multiprocessing systems. One area of focus concerns possible improvements to the routing and execution of commands in the system.

One drawback of the known arrangements is the time needed to execute commands. In a system of networked servers, for example, a system administrator may need to execute commands at a number of different networked servers. These tasks may involve making status inquiries, running diagnostics, changing operating settings, etc. In this event, the system administrator logs-in to each desired server and then executes the desired command; in more advanced systems, the system administrator may log-in to the desired servers remotely via one convenient, nearby server. In either case, when many different servers are involved, there is a significant time penalty, since the administrator must take steps to route each command to the desired server and arrange for execution there. The time penalty still applies even if the same command is being executed at each server.

This time inefficiency presents a number of problems. First, it burdens the system administrator with more work, making the system more costly to operate. It may be necessary, for example, to hire more system administrators. Additionally, where data gathering commands are concerned, the resultant data might be stale by the time the system administrator enters the lengthy set of commands to request the data from all servers. As another limitation, the lengthy and repetitive process of manually entering redundant commands at many different servers can be prone to user error. For example, the user may inadvertently forget to enter the command at one server because heishe loses track of his/her progress in the overall process of entering that command at twenty different servers.

Consequently, the known techniques for command routing and execution in distributed processing systems are not completely adequate for some applications due to certain unsolved problems.

SUMMARY OF THE INVENTION

Broadly, the invention concerns a technique to employ any node in a multi-node processing system to route commands to a selected group of one or more nodes and initiate local command execution if permitted by local security provisions. The system includes multiple application nodes interconnected by a network. The application nodes comprise servers, workstations, mainframe computers, personal computers, or other digital processing machines, or even application program instances or a combination of software and hardware. There are also one or more administrator nodes, each coupled to at least one of the application nodes. The administrator nodes may comprise computers, software application programs, communication consoles or terminals remotely located or attached to the application nodes, etc. The administrator nodes are used, for example, by system administrators, and each administrator node has certain security credentials.

The process begins by the administrator node transmitting input to one of the application nodes, referred to as an "entry" node. The input includes a command and routing information specifying a list of desired application nodes to execute the command. The list may identify nodes individually and/or by predefined groups containing multiple nodes. The identified nodes are called "destination" nodes, and may include the entry node itself. In response to this input, the entry node transmits messages to all identified application nodes to (1) log-in to the destination nodes using the originating administrator node's security credentials and (2) direct the destination nodes to execute the command. The transmission of these messages may be expedited by sending the messages a synchronously.

By consulting locally stored security credentials, each destination node determines whether the entry node's log-in should succeed. If so, the destination node continues by consulting locally stored authority information to determine whether the initiating administrator node has authority to execute the requested command. If so, the destination node attempts to execute the command. Ultimately, the destination node returns a response message indicating the outcome of the destination node's actions. The response may indicate, for example, that the log-in failed due to improper security credentials, the log-in succeeded but the command failed, or that the log-in and command succeeded (along with any output from the command). The entry node may receive responses concurrently while still transmitting command and routing information. Ultimately, the entry node organizes the received responses and sends a representative output to storage, the initiating administrator node, or another suitable location.

In one embodiment, the invention may be implemented to provide a method to employ any node in a multi-processing system to route commands to a selected group of one or more nodes and initiate local command execution if permitted by local security provisions. In another embodiment, the invention may be implemented to provide an apparatus, such as a multi-processing system, configured to employ any node in a multi-processing system to route commands to a selected group of one or more nodes and initiate local command execution if permitted by local security provisions. In still another embodiment, the invention may be implemented to provide a signal-bearing medium tangibly embodying a program of machine-readable instructions executable by a digital data processing apparatus to perform method steps to employ any node in a multi-processing system to route commands to a selected group of one or more nodes and initiate local command execution if permitted by local security provisions.

The invention affords its users with a number of distinct advantages. First, the invention enables a system administrator to quickly universally issue a command to many different nodes of a multi-processing system. Money is also saved because fewer system administrators can efficiently manage more application nodes. In addition to saving time, this reduces the potential for committing errors in the otherwise tedious work of repeatedly issuing the same command to the different nodes. Also, by enabling a system administrator to quickly gather data from diverse nodes in the system, the invention ensures that the resultant data is still current when it arrives. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a technique that employs any node in a multi-node computing system to route commands to a selected group of one or more other nodes, and then initiate local execution of the commands if permitted by local security provisions.

HARDWARE COMPONENTS & INTERCONNECTIONS

Multi-Node Computing System

One aspect of the invention concerns a multi-node computing system, which may be embodied by various hardware components and interconnections. One example is the multi-node computing system 100 shown in FIG. 1. The system 100 includes multiple nodes, which include application nodes 102 and one or more administrator nodes 106/108. The application nodes 102 are interconnected by a network 104. Each administrator node 106/108 is coupled to at least one of the application nodes 102.

Application Node

The application nodes comprise processing elements, such as computing machines, software, or a combination. As examples of computing machines, each application node may comprise a personal computer, mainframe computer, workstation, supercomputer, microprocessor, or another digital data processing machine. In contrast, an application node may instead comprise an instance of an application program, a software thread, subroutine, or another software construct. Application nodes may also be provided by combinations of hardware, software, firmware, and the like.

Figure 1:
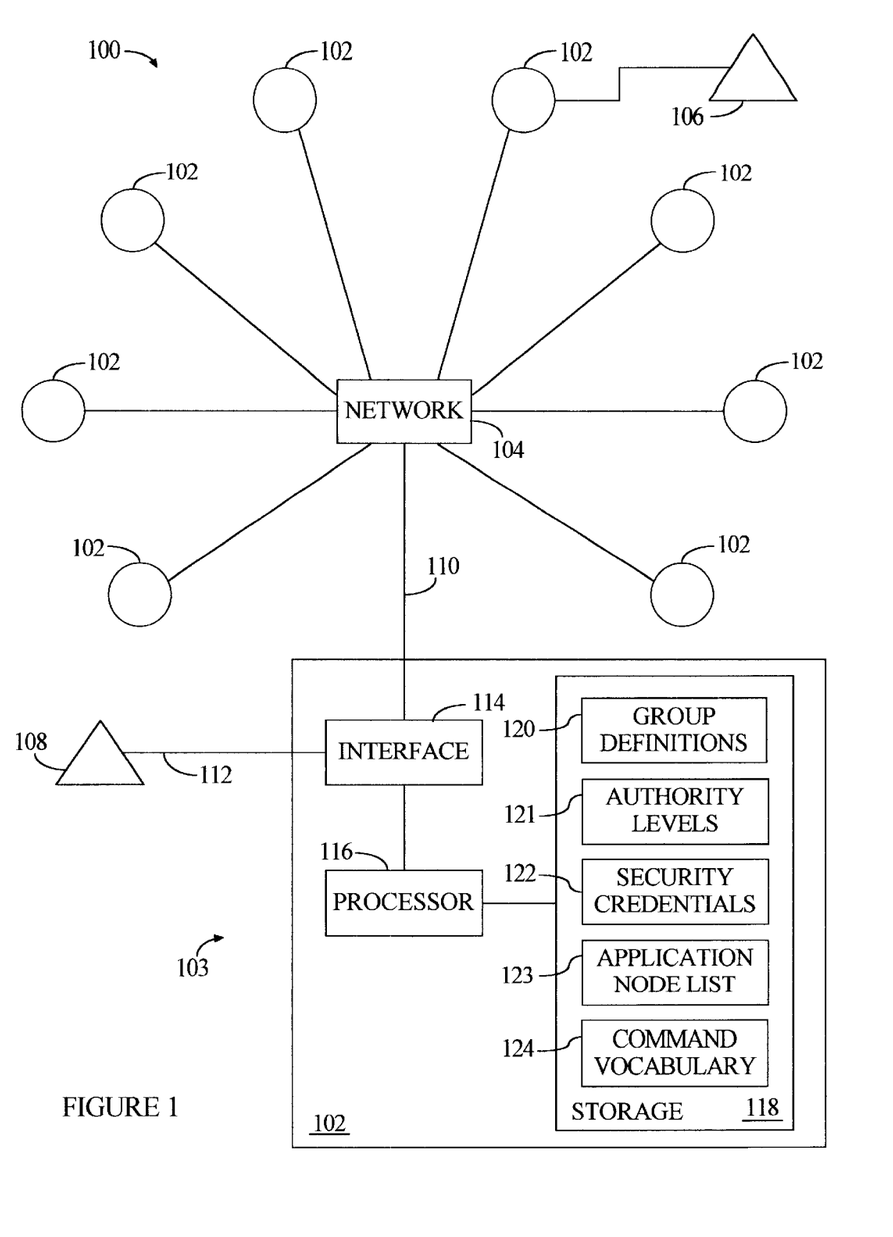
FIG. 1 is a block diagram of the hardware components and interconnections of a distributed processing system in accordance with the invention.

To provide a specific example, the application nodes 102 may comprise digital data storage servers, such as IBM brand RS/6000 machines, running the ADSTAR™ Distributed Storage Manager (ADSM™) storage management software. In this example, one of the application nodes 102 is implemented by hardware components, which are shown in an exploded view 103 of an exemplary node 102. As shown in the view 103, exemplary node 102 includes a processor 116, an interface 114, and a storage 118. The processor 116 may comprise one or more microprocessors, an application specific integrated circuit, or any other suitable digital data processing element. The interface 114 facilitates communications between the processor 116 and the network 104, and between the processor 116 and the attached administrator node 108. The interface 114 may comprise a modem, intelligent input/output channel, bus, or any other suitable component.

The storage 118 comprises writable non-volatile storage such as magnetic disk. storage media, magnetic tape, optical media, battery-supported random access memory (RAM), and the like. The storage 118 includes various reference data, which may be organized by linked list, relational database, lookup table, or any other convenient data structure. The reference data includes group definitions 120, authority levels 121, credentials 122, and an application node list 123.

The group definitions 120, an optional component of the node 103, contains mappings between various "node groups" and one or more constituent application nodes of each group. As explained below, administrator nodes may refer to a node group as shorthand for the constituent application nodes. For convenience and ease of operation, the group definitions 120 may comprise an identical list at each application node.

The authority levels 121 lists which commands each administrator node is permitted to execute on the node 103. Depending on the overall system design, the authority levels 121 may give all administrator nodes the same authority at the node 103, or different administrator nodes may have varying levels of authority at the node 103. Moreover, the stored authority levels 121 may vary from application node to application node.

The security credentials 122 comprise security related identification from all administrator nodes. The node 102 consults the credentials 122 to authenticate an administrator node's identity when that administrator node is attempting to log-in to the application node 103. The credentials may comprise, for example, a password and user name, which may be encrypted using a public/private key encryption such as Pretty Good Privacy (PGP), Kerberos, Secured Socket Layer (SSL), etc.

The application node list 123 includes information identifying all application nodes 102 in the system 100. When the administrator 108 node requests access to another one of the application nodes 102 than the particular node 103, the node 103 consults its list 123 to more specifically identify the desired application node. As an example, the list 123 may contain a mapping between names and addresses of the nodes 102 in the system 100.

The node 103 also includes a command vocabulary list 124. Contents of the list 124 determine which commands are recognized (and thus executable) by the node 103. The list 124 may be configured to recognize certain platform-independent commands, as well as platform-dependent commands. The list 124 may be implemented as a linked list, lookup table, relational database, or another data structure. As an alternative, the list 124 may be embodied by software (such as compiled or executable binary code), firmware, or hardware configured to execute certain predetermined commands. Depending on the application needs, the command vocabularies 124 may vary from node to node, or call nodes may contain identical command vocabularies 124.

Network

The network 104 comprises a suitable hardware and/or software mechanism to relay messages between the application nodes 102. The network 104 may comprise telephone lines, cable television lines, an Ethernet, token ring, ATM network, local area network, wide area network, Internet, Intranet, fiber optic link, satellite, radio or other electromagnetic link, or another suitable communications link operatively connecting the nodes 102. In implementations where two or more application nodes 102 comprise separate application program instances on the same machine, the network 104 also includes a motherboard, backplane, LAN card, bus, or other necessary hardware and/or software interconnecting these nodes 102. Communications over the network 104 may employ any suitable protocol, such as TCP/IP, APPC, etc.

Administrator Node

Chiefly, the administrator nodes 106/108 enable a system administrator to issue instructions to one or more application nodes. The system administrator may, for example, be a human operator. As explained below, an administrator node transmits a desired command and routing information directly to the application node attached to the administrator node. The application node attached to an administrator node is called an "entry" node. The entry node forwards the desired command to all appropriate application nodes according to the received routing information.

In the case of a human system administrator, the administrator nodes may comprise user terminals, web televisions, computers, server consoles, keyboards, etc. Where the system administrator is embodied by an application program, hardware, or other automated means, the administrator node may comprise such hardware and/or software. The administrator node may even comprise an input mechanism (such as a user console) that is part of the hardware of an application node.

Exemplary Digital Data Processing Apparatus

Figure 2:
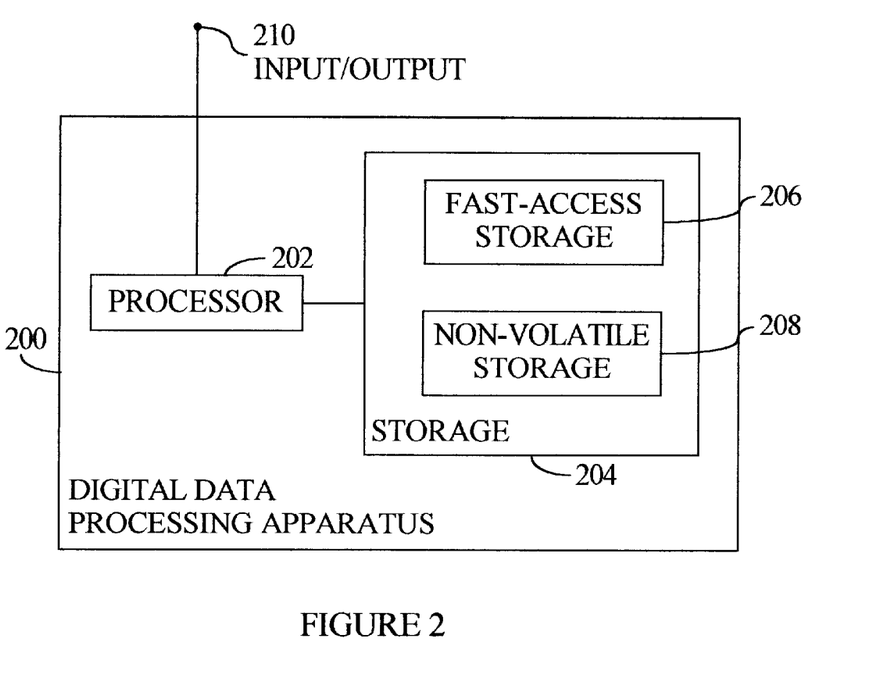
FIG. 2 is a block diagram of a digital data processing machine in accordance with the invention.

Another aspect of the invention concerns a digital data processing apparatus, containing various hardware components and interconnections, which may embody any one of the application nodes. FIG. 2 shows an example of one digital data processing apparatus 200. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory, and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for exchanging data with the processor 202.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

OPERATION

In addition to the various hardware embodiments described above, a different aspect of the invention concerns a method to employ one node in a multi-node computing system to route commands to a selected group of one or more nodes, and then locally execute the commands if permitted by local security provisions.

Signal-Bearing Media

In the context of FIGS. 1–2, one aspect of this method involves the operation of an application node 102, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to route commands to a selected group of one or more application nodes, and then locally execute the commands if permitted by local security provisions.

Figure 3:
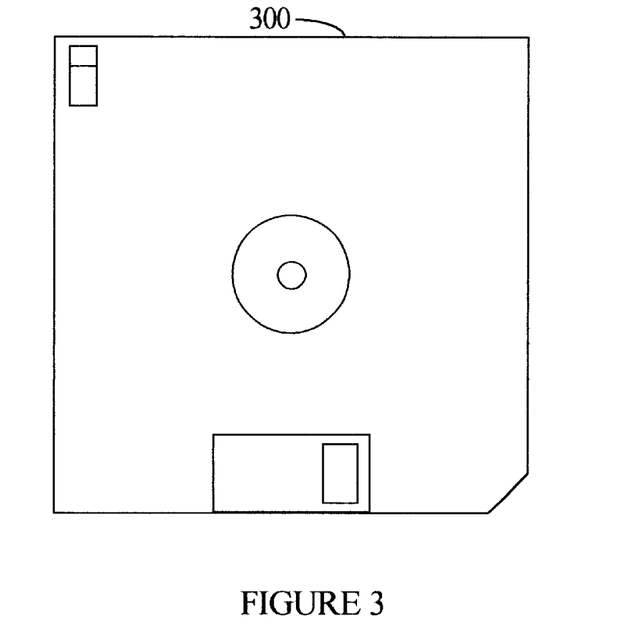
FIG. 3 shows an exemplary signal-bearing medium in accordance with the invention.

This signal-bearing media may comprise, for example, RAM (not shown) contained within the storage 204, as represented by the fast-access storage 208. Alternatively, the instructions may be contained in another signal-bearing media, such as a magnetic data storage diskette 300 (FIG. 3), directly or indirectly accessible by the processor 202. Whether contained in the storage 204, diskette 300, or elsewhere, the instructions may be stored on a variety of machine-readable data storage media, such as direct access storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Overall Sequence of Operation

Generally, the overall operation of the invention occurs as follows. An administrator node first transmits input to the entry node. This input includes a command along with routing information specifying a list of one or more application nodes, called "destination" nodes. The entry node itself may be named as one of the destination nodes. The input also includes security credentials of the administrator node to authenticate itself. When the entry node receives this input, it consults its locally stored security credentials 122 to verify the administrator node's submitted security credentials. Upon verification, the entry node acts as a proxy for the initiating administrator node by a synchronously transmitting certain messages to the destination nodes. These messages include a request to log-in to the destination nodes using the administrator node's security credentials, and a request for the destination nodes to execute the command submitted by the administrative node.

When the destination nodes receive these messages, they may permit the entry node to log-in and remotely execute the desired command. Log-in is only permitted if security credentials of the initiating administration node (forwarded by the entry node) match the destination node's locally stored security credentials 122 for that particular administrator node. Command execution is only permitted if the locally stored authority levels 121 show that the initiating administrator node is authorized to execute the desired command, and the command is recognized by the command vocabulary 124.

Each destination node returns responses representing the outcome of execution of the command. These responses indicate whether the log-in succeeded, whether the command was executed and any results of command execution, etc. The entry node receives and organizes these responses, and ultimately provides a representative output to storage, the administrator node, or another location.

Operation of Entry Node

Figure 4:
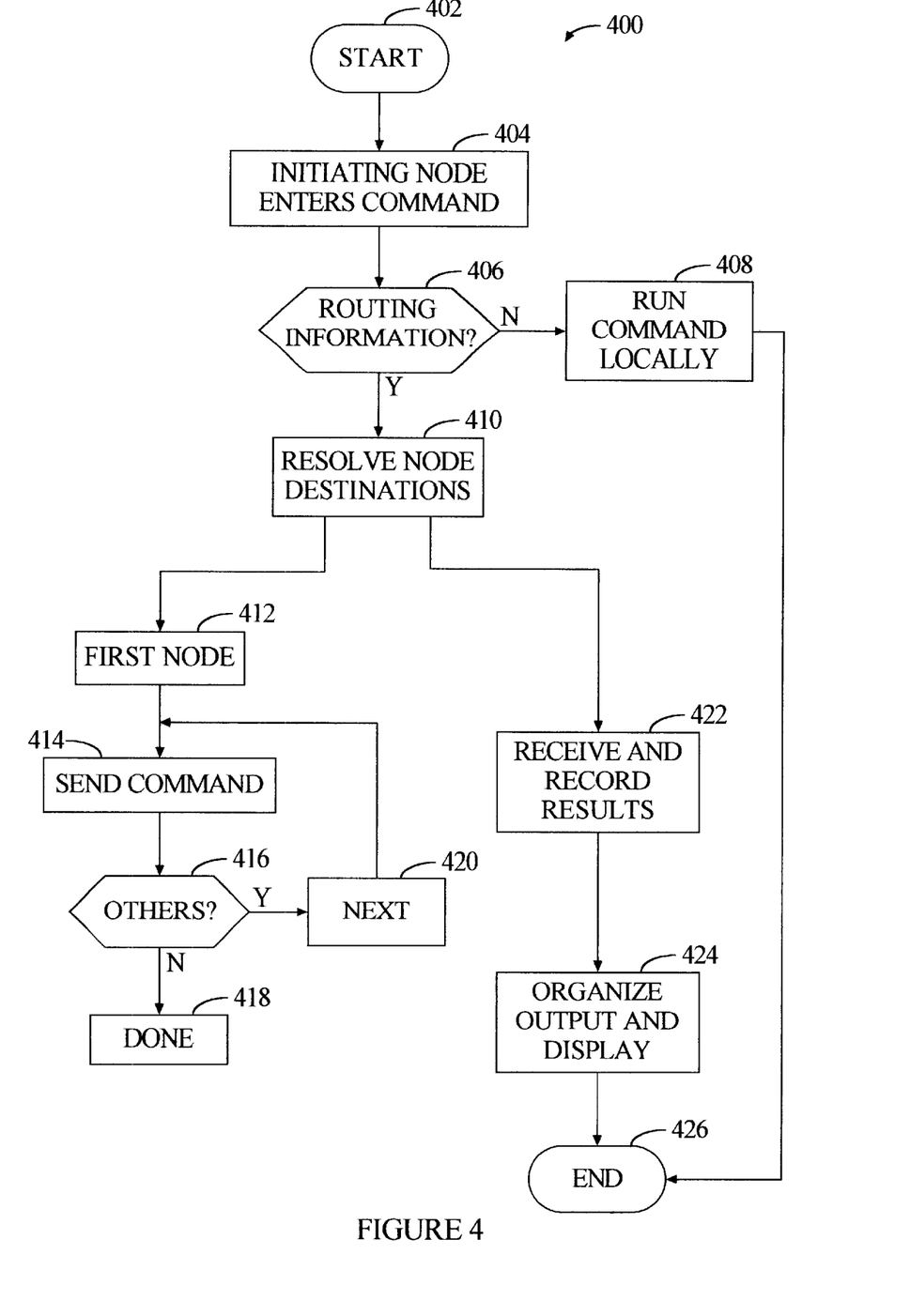
FIG. 4 is a flowchart of a sequence showing operation of an application node in the role of entry node, in accordance with the invention.

The present invention includes a number of different method aspects, one of which is shown by FIG. 4. Namely, FIG. 4 depicts a sequence 400 performed by an application node in the role of entry node, to route and execute commands in a multi-processing system. For ease of explanation, but without any intended limitation, the example of FIG. 4 is described in the context of the system 100 described above (FIG. 1).

The steps are initiated in step 402 In step 404, one of the administrator nodes submits a desired command to the application node performing the sequence 400. This administrator node is called the "initiating" administrator node, and to provide a specific example, comprises the node 108. The application node receiving the administrator node's command is the "entry node," and in this example comprises the node 103.

The command of step 404 is accompanied by routing information. The routing information specifies one or more application nodes 102 at which the initiating administrator node desires to execute the associated command. These are called "destination" nodes. The destination nodes may include the entry node, if desired. The routing information may include one or more individual node names and/or names of predefined groups including multiple nodes. The mapping between group names and individual application nodes is stored in the application nodes' group definitions 120.

In an embodiment where the system 100 is running the IBM brand ADSM software, some examples of commands requested by the initiating administrator node include query status, halt, register node, lock/unlock node, restore, and other similar commands.

After step 404, the entry node 103 determines whether the entered command was accompanied by any routing information. If not, as a default, the entry node executes the command in step 408 using itself as the sole destination node. Following step 408, the routine 400 ends in step 426.

Alternatively, if the entered command included routing information, the entry node 103 identifies the destination nodes in step 410. This is performed by cross-referencing various data with the node names and group names provided by the initiating node. Node names, for example, may be resolved using the application node list 123, which may provide machine addresses, for example. Group names are resolved first using the group definition list 120 to obtain node names, then using the list 123 to obtain more specific information such as machine addresses.

Following step 410, the entry node considers a first one of the destination nodes (step 410). This node may be called the "current" node. In step 414, the entry node 103 sends the current node the command originally entered in step 404, and initiates execution of that command by that destination node. Step 414 includes the following sub-steps. First, the entry node 103 attempts to log-in to the destination node using credentials of the administrator node. If the log-in is successful, the entry node 103 requests the destination node to execute the initiating node's command. The execution of the requested command may succeed or fail, depending upon whether the administrator node has sufficient authority to execute the command (per the levels 121), and whether the requested command is recognized by the destination node (per the list 124).

Following step 414, the entry node 103 in step 416 asks whether the command still needs to be sent to other destination nodes, which were resolved in step 410. If so, step 420 progresses to the next resolved destination node, making this the "current" destination node. After step 420, the command is sent in step 414, in the same manner as discussed above. When the command of step 404 has been sent to all resolved destination nodes, the entry node is finished, as shown by step 418.

As shown above, the entry node transmits and initiates commands at the destination nodes in asynchronous fashion, without waiting for any return messages concerning the command's success or failure. In other words, command are sequentially transmitted and execution initiated without waiting for the previous command to finish. This is advantageous because each different destination node may take a different amount of time to process the requested command and return a responsive output message.

Concurrently with step 412–418, the entry node 103 receives and records feedback from destination nodes in step 422. This feedback comprises an outcome of the commands initiated at the destination nodes. Such outcome may comprise, for example, requested data, a message signaling satisfactory completion of the command, a message indicating failure of the command, a message indicating statistics about how the command completed, etc.

The entry node 103 may receive feedback from some destination nodes (step 422) simultaneously while still transmitting commands to other destination nodes (step 414). Receipt of feedback is complete when the entry node 103 receives feedback from all destination nodes. Optionally, step 422 may complete irrespective of receiving feedback from all destination nodes if another condition is met, such as a timeout.

Following step 422, the entry node 103 organizes the output from the various destination nodes and sends the output to a "target" location. Such organization may involve sorting or other ordering, aggregation, reformatting, other operations, or a combination of the foregoing. The target location may comprise storage local to the entry node 103, storage located elsewhere, or another location. In the example of FIG. 4, the entry node 103 returns the organized output back to the initiating administrator node.

Operation of Destination Node

Figure 5:
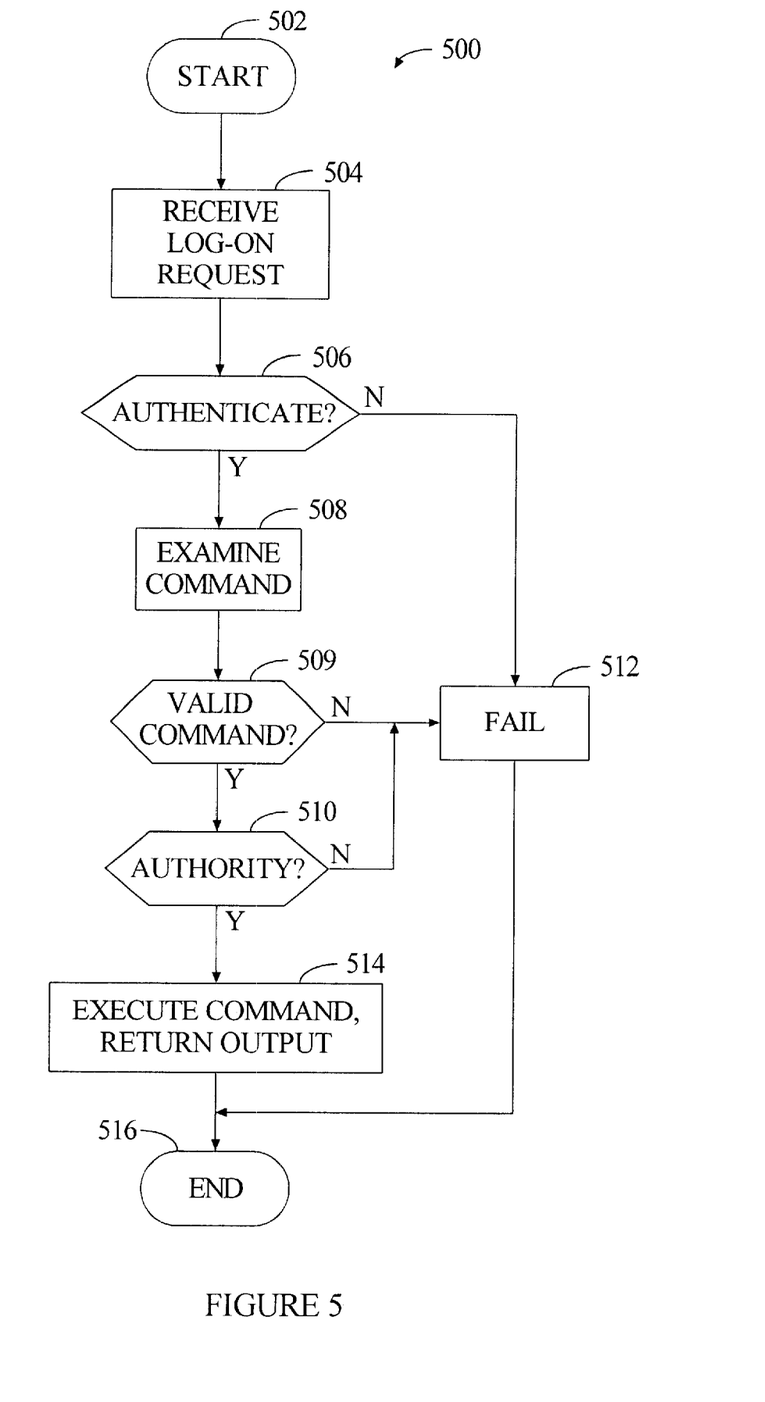
FIG. 5 is a flowchart of a sequence showing operation of an application node in the role of a destination node, in accordance with the invention.

In addition to the sequence of FIG. 4, FIG. 5 shows another aspect of the present invention. Namely, FIG. 5 depicts a sequence 500 performed by a destination node to receive, verify, and execute routed commands in a multi-processing system. For ease of explanation, but without any intended limitation, the example of FIG. 5 is described in the context of the system 100 described above. The sequence 500 is performed in response to the entry node performing step 414, FIG. 4.

The steps are initiated in step 502. In step 504, the destination node receives a log-in request (submitted by the entry node in step 414, FIG. 4). The entry node's log-in request includes credentials of the initiating application node, which may be obtained from the security credentials 122. The credentials may include, for example, a user name and a password. After step 504, the destination node attempts to authenticate the entry node's submitted credentials (step 506). Step 506 is performed by the destination node consulting its own security credentials 122 for the initiating node, and determining whether the stored credentials match those submitted by the entry node. If the credentials do not match, the entry node's attempted log-in on behalf of the initiating node fails (step 512). In step 512, the destination node also returns a failure message to the entry node, indicating the cause of the failure. After step 512, the routine 500 ends in step 516.

If authentication succeeds, however, the destination node proceeds to examine the received command in step 508. In particular, in step 509 the destination node determines whether the submitted command is valid at that destination node. This is performed by the destination node consulting its command vocabulary 124 to ascertain whether the submitted command is present. If not, step 509 advances to step 512, where the operation fails. Step 512 returns a failure message to the entry node citing the cause of the failure.

In contrast, if the submitted command is valid, the destination node determines whether the initiating node has authority to remotely execute the requested command at this particular destination node. This is achieved by the destination node consulting its authority levels 121, and determining whether the initiating node is authorized to perform the present command. If the initiating node lacks authority to execute the requested command, step 510 advances to step 512, where the operation fails. In step 512, the destination node also returns a failure message to the entry node, indicating the reason for the failure. After step 512, the routine 500 ends in step 516.

In contrast, if the initiating node has the required authority, the destination node executes the requested command in step 514. Also in step 514, the destination node returns feedback to the entry node representing the successful completion of the command, details about the command's completion, etc. After step 514, the routine 500 send in step 516.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A method for routing messages in a multi-node processing system including multiple interconnected application nodes, the method comprising:

transmitting input from an originating entity to a first one of the application nodes, the input including a command and also including routing information identifying multiple of the application nodes, the originating entity having associated security credentials;

the first node receiving the input and in response, a synchronously transmitting messages to all identified application nodes to log-in to those nodes using the originating entity's security credentials and request each of the identified nodes to execute the command;

the identified application nodes receiving the transmitted messages, and in response, each of the identified application nodes reviewing the security credentials to determine whether the log-in is permitted, and if the log-in is not permitted, aborting execution of the command;

if the log-in is permitted, permitting the first node to log-in and request execution of the command, and in response to the request to execute the command, the identified application node executing the command;

sending the first node a response representing outcome of the execution of the command; and in response to the first application node receiving any responses from the identified application nodes, the first application node organizing the responses and providing a representative output.

2. The method of claim 1, where the first node performs the transmission of messages and receiving of responses concurrently.

3. The method of claim 1, where:

the routing information specifies one or more node groups; and the method further includes the first node referencing a stored group definition list to identify individual nodes represented by the specified node groups.

4. The method of claim 1, where:

each application node has access to a reference list of security credentials;

each message a synchronously transmitted by the first node to all identified application nodes to log-in to those nodes further includes security credentials of the originating entity;

responsive to the first node a synchronously transmitting messages to all identified application nodes to log-in to those nodes, the identified application nodes perform operations comprising:

consulting their respective reference lists of security credentials to determine whether the transmitted security credentials are represented therein;

only if the transmitted security credentials are represented in the reference list of security credentials, permitting the first node to log-in to the identified application nodes.

5. The method of claim 1, where:

each application node has access to a list of authority information;

the method further comprises, responsive to the first node a synchronously transmitting the messages, each identified application node consulting its respective authority information to determine whether the originating entity is authorized to request the command; and only if the originating entity is authorized to request the command, executing the command.

6. The method of claim 1, where each response representing outcome of the execution of the command at a particular application node includes at least one of the following:

whether the first node succeeded in logging-in to the application node;

whether the application node executed the command;

conditions at the application node as a result of having executed the command.

7. The method of claim 1, where:

each application node has access to a command vocabulary list;

the method further comprises, responsive to the first node a synchronously transmitting the messages, each identified application node consulting its respective command vocabulary list to determine whether the command is valid at the identified application node, and the identified application node proceeding to execute the command only if the command is valid at the identified application node.

8. The method of claim 1, the method further comprising:

the first node providing the representative output to the originating entity.

9. The method of claim 1, where the application nodes identified by the routing information include the first node.

10. A method for routing messages in a multi-node processing system including multiple interconnected application nodes, the method comprising:

a first application node receiving input from an originating entity having assigned security credentials, the input including a command and routing information identifying multiple application nodes;

responsive to the input, the first application node a synchronously transmitting messages to all identified application nodes to log-in to those nodes using the originating entity's security credentials and request each of the identified application nodes to execute the command; and the first application node determining whether any responses have been received from the identified application nodes where each response represents an outcome of execution of the command at that application node, and if any responses have been received, the first application node organizing the responses and providing a representative output.

11. The method of claim 10, where the first application node performs the transmission of messages and receiving of responses concurrently.

12. The method of claim 10, where:

the routing information specifies one or more node groups;

the method further includes the first application node referencing a stored group definition list to identify individual nodes represented by the specified node groups.

13. The method of claim 10, where:

each message a synchronously transmitted by the first application node to all identified application nodes to log-in to those nodes further includes security credentials of the originating entity, the security credentials including a user name and a password.

14. The method of claim 10, where:

each application node has access to a list of authority information;

the method further comprises, responsive to the first application node a synchronously transmitting the messages, each identified application node consulting its respective authority information to determine whether the originating entity is authorized to request the command; and only if the originating entity is authorized to request the command, executing the command.

15. The method of claim 10, where each response representing outcome of the execution of the command at a particular application node includes at least one of the following:

whether the first node succeeded in logging-in to the application node;

whether the application node executed the command;

conditions at the application node as a result of having executed the command.

16. The method of claim 10, where:

each application node has access to a command vocabulary list;

the method further comprises, responsive to the first node a synchronously transmitting the messages, each identified application node consulting its respective command vocabulary list to determine whether the command is valid at the identified application node, and the identified application node proceeding to execute the command only if the command is valid at the identified application node.

17. The method of claim 10, the method further comprising:

the first application node providing the representative output to the originating entity.

18. The method of claim 10, where the application nodes identified by the routing information include the first application node.

19. A signal-bearing medium tangibly embodying a program of machine-readable instructions executable by a digital processing apparatus to perform a method for routing messages in a multi-node processing system that includes multiple interconnected application nodes, the method comprising:

a first application node receiving input from an originating entity having assigned security credentials, the input including a command and routing information identifying multiple application nodes;

responsive to the input, the first application node a synchronously transmitting messages to all identified application nodes to log-in to those nodes using the originating entity's security credentials and request each of the identified application nodes to execute the command; and the first application node determining whether any responses have been received from the identified application nodes where each response represents an outcome of execution of the command at that application node, and if any responses have been received, the first application node organizing the responses and providing a representative output.

20. The medium of claim 19, where the application node performs the transmission of messages and receiving of responses concurrently.

21. The medium of claim 19, where:

the routing information specifies one or more node groups;

the method further includes the first node referencing a stored group definition list to identify individual nodes represented by the specified node groups.

22. The medium of claim 19, where:

each message a synchronously transmitted by the first application node to all identified application nodes to log-in to those nodes further includes security credentials of the originating entity, the security credentials including a user name and a password.

23. The medium of claim 19, where:

each application node has access to a list of authority information;

the method further comprises, responsive to the first application node asynchronously transmitting messages, each identified application node consulting its respective authority information to determine whether the originating entity is authorized to request the command; and only if the originating entity is authorized to request the command, executing the command.

24. The medium of claim 19, where each response representing outcome of the execution of the command at a particular application node includes at least one of the following:

whether the first node succeeded in logging-in to the application node;

whether the application node executed the command;

conditions at the application node as a result of having executed the command.

25. The medium of claim 19, where:

each application node has access to a command vocabulary list;

the method further comprises, responsive to the first node a synchronously transmitting the messages, each identified application node consulting its respective command vocabulary list to determine whether the command is valid at the identified application node, and the identified application node proceeding to execute the command only if the command is valid at the identified application node.

26. The medium of claim 19, the method further comprising:

the first application node providing the representative output to the originating entity.

27. The medium of claim 19, where the application nodes identified by the routing information include the first application node.

28. A computing system, comprising:

multiple application nodes; and a network interconnecting the application nodes;

where the application nodes are programmed to perform operations to route messages to one or more of the application nodes for execution therein, the operations comprising:

a first one of the nodes receiving input from an originating entity having assigned security credentials, the input including a command and also including routing information identifying multiple application nodes;

in response to receiving the input, the first node asynchronously transmitting messages to all identified application nodes to log-in to those nodes using the entity's security credentials and request each of the identified nodes to execute the command;

the identified application nodes receiving the transmitted messages, and in response, each of the identified application nodes reviewing the security credentials to determine whether the log-in is permitted, and if the log-in is not permitted, aborting execution of the command;

if the log-in is permitted, permitting the first node to log-in and request execution of the command, and in response to the request to execute the command, the identified application node executing the command; and sending the first node a response representing outcome of the execution of the command; and in response to the first application node receiving any responses from the identified application nodes, the first application node organizing the responses and providing a representative output.

29. The system of claim 28, where at least one of the application nodes comprises an instance of an application program.

30. The system of claim 28, where at least one of the application nodes comprises a digital processing apparatus.

31. The system of claim 28, where at least one of the application nodes comprises a digital data storage server.

32. The system of claim 28, where at least two of the application nodes comprise separate digital computers, and the network includes communications links operatively interconnecting the digital computers.

33. The system of claim 28, where at least two of the application nodes comprise separate instances of an application program executing on a single computer, and the network includes intra-computer communications link between the application program instances.

34. The system of claim 28, where the application nodes are programmed to perform the transmission of messages and receiving of responses concurrently.

35. The system of claim 28, where:

the routing information specifies one or more node groups; and the method further includes the first node referencing a stored group definition list to identify individual nodes represented by the specified node groups.

36. The system of claim 28, where:

each application node has access to a reference list of security credentials;

each message a synchronously transmitted by the first node to all identified application nodes to log-in to those nodes further includes security credentials of the originating entity;

responsive to the first node a synchronously transmitting messages to all identified application nodes to log-in to those nodes, the identified application nodes perform operations comprising:

consulting their respective reference lists of security credentials to determine whether the transmitted security credentials are represented therein;

only if the transmitted security credentials are represented in the reference list of security credentials, permitting the first node to log-in to the identified application nodes.

37. The system of claim 28, where:

each application node has access to a list of authority information;

the method further comprises, responsive to the first node a synchronously transmitting the messages, each identified application node consulting its respective authority information to determine whether the originating entity is authorized to request the command; and only if the originating entity is authorized to request the command, executing the command.

38. The system of claim 28, where each response representing outcome of the execution of the command at a particular application node includes at least one of the following:

whether the first node succeeded in logging-in to the application node;

whether the application node executed the command;

conditions at the application node as a result of having executed the command.

39. The system of claim 28, where:

each application node has access to a command vocabulary list;

the method further comprises, responsive to the first node asynchronously transmitting the messages, each identified application node consulting its respective command vocabulary list to determine whether the command is valid at the identified application node, and the identified application node proceeding to execute the command only if the command is valid at the identified application node.

40. The system of claim 28, the method further comprising:

the first node providing the representative output to the originating entity.

41. The system of claim 28, where the application nodes identified by the routing information include the first application node.

42. A distributed computing system, comprising:

one or more administrator nodes each having predefined security credentials; and multiple application nodes, where each administrator node is coupled to at least one application node, and each application node includes storage containing:
authority levels listing a number of operations and which administrator nodes if any are permitted to perform that operation on the application node; and
security credentials of all administrator nodes;

a network interconnecting the application nodes;

where each application node is programmed to perform operations to route messages from an attached administrator node to application nodes, the operations comprising:
responsive to a first on of the application nodes receiving input from an administrator node, the input including a command and also including routing Information identifying multiple of the application nodes, the first node performing operations comprising:
consulting the security credentials in storage to retrieve the security credentials of the administrator node;
asynchronously transmitting messages to all identified application nodes to log-in to those nodes using the retrieved security credentials and request each of the identified application nodes to execute the command;
the identified application nodes receiving the transmitted messages, and
in response, each identified application node:
consulting the stored security credentials to determine whether the transmitted security credentials are valid, and if not, failing the log-in attempt;
if the transmitted security credentials valid, consulting the stored authority levels to determine whether the administrator node is authorized to request execution of the command, and only if so, requesting the application node to execute the command;

sending the first application node a response representing outcome of execution of the command; and responsive to the first application node receiving any responses the identified application nodes, the first application node organizing the responses and providing a representative output.

43. A command relay system, comprising:

multiple application nodes;

a network interconnecting the application nodes;

where the application nodes are programmed to perform operations to selectively receive and relay commands to other application nodes and arrange for local execution thereby, the operations comprising:
receiving input from an originator, the input including a command and also including routing information identifying multiple of the application nodes;
responsive to the input, the application node asynchronously responding to the input by log-in to each of the identified application nodes using security credentials of the originator and requesting each of the identified nodes to execute the command;
responsive to receiving any responses from the identified application nodes resulting from execution of the command thereby, the application node organizing the responses and providing a representative output to the originator.

44. The command relay system of claim 43, where each application node is further programmed to perform operations comprising:

responsive to receiving a log-in attempt, reviewing the security credentials to determine whether the log-in is permitted, and
if the log-in is not permitted, aborting execution of the command;
if the log-in is permitted, permitting the log-in executing the requested command; and
returning a response representing outcome of the execution of the command.

45. The system of claim 43, where:

each application node is programmed such that the operation of receiving routing information comprises receiving identification of one or more node groups each node group being associated with a predetermined selection of application nodes;

each application node is further programmed to reference a stored group definition list to identify individual nodes represented by the specified node groups.

46. The system of claim 44, where each application node is programmed to receive input from the originator free from any security credentials, and responsive thereto to perform operations comprising retrieving security credentials associated with the originator from storage.

* * * * *

UNITED STATES PATENT AND TRADEMARK OFFICE
CERTIFICATE OF CORRECTION

PATENT NO.    : 6,389,543 B1
DATED         : May 14, 2002
INVENTOR(S)   : Colin Scott Dawson et al.

It is certified that error appears in the above-identified patent and that said Letters Patent is hereby corrected as shown below:

Column 9,
Line 65, delete the space between "a" and "synchronously".

Column 10,
Line 32, delete the space between "a" and "synchronously".
Line 36, delete the space between "a" and "synchronously".
Line 52, delete the space between "a" and "synchronously".

Column 11,
Line 5, delete the space between "a" and "synchronously".
Line 23, delete the space between "a" and "synchronously".
Line 47, delete the space between "a" and "synchronously".
Line 56, delete the space between "a" and "synchronously".

Column 12,
Line 10, delete the space between "a" and "synchronously".
Line 33, delete the space between "a" and "synchronously".
Line 57, delete the space between "a" and "synchronously".

Column 13,
Line 19, delete the space between "a" and "synchronously".

Column 14,
Line 29, delete the space between "a" and "synchronously".
Line 33, delete the space between "a" and "synchronously".
Line 48, delete the space between "a" and "synchronously".

Column 15,
Line 2, delete the space between "a" and "synchronously".
Line 32, delete the word "on" and replace with -- one --.
Line 35, replace the capital "I" on the word "Information" with a lower case -- i --.
Line 52, insert the word -- are -- between the words "credentials" and "valid".

UNITED STATES PATENT AND TRADEMARK OFFICE
CERTIFICATE OF CORRECTION

PATENT NO. : 6,389,543 B1
DATED : May 14, 2002
INVENTOR(S) : Colin Scott Dawson et al.

It is certified that error appears in the above-identified patent and that said Letters Patent is hereby corrected as shown below:

Column 16,
Line 5, insert the word -- from -- between "responses" and "the identified".

Signed and Sealed this

Twenty-ninth Day of October, 2002

Attest:

Attesting Officer

JAMES E. ROGAN
Director of the United States Patent and Trademark Office